April 10, 1956
R. A. BRUNER
2,741,012
MOLDING MACHINE
Filed June 8, 1950
8 Sheets-Sheet 1
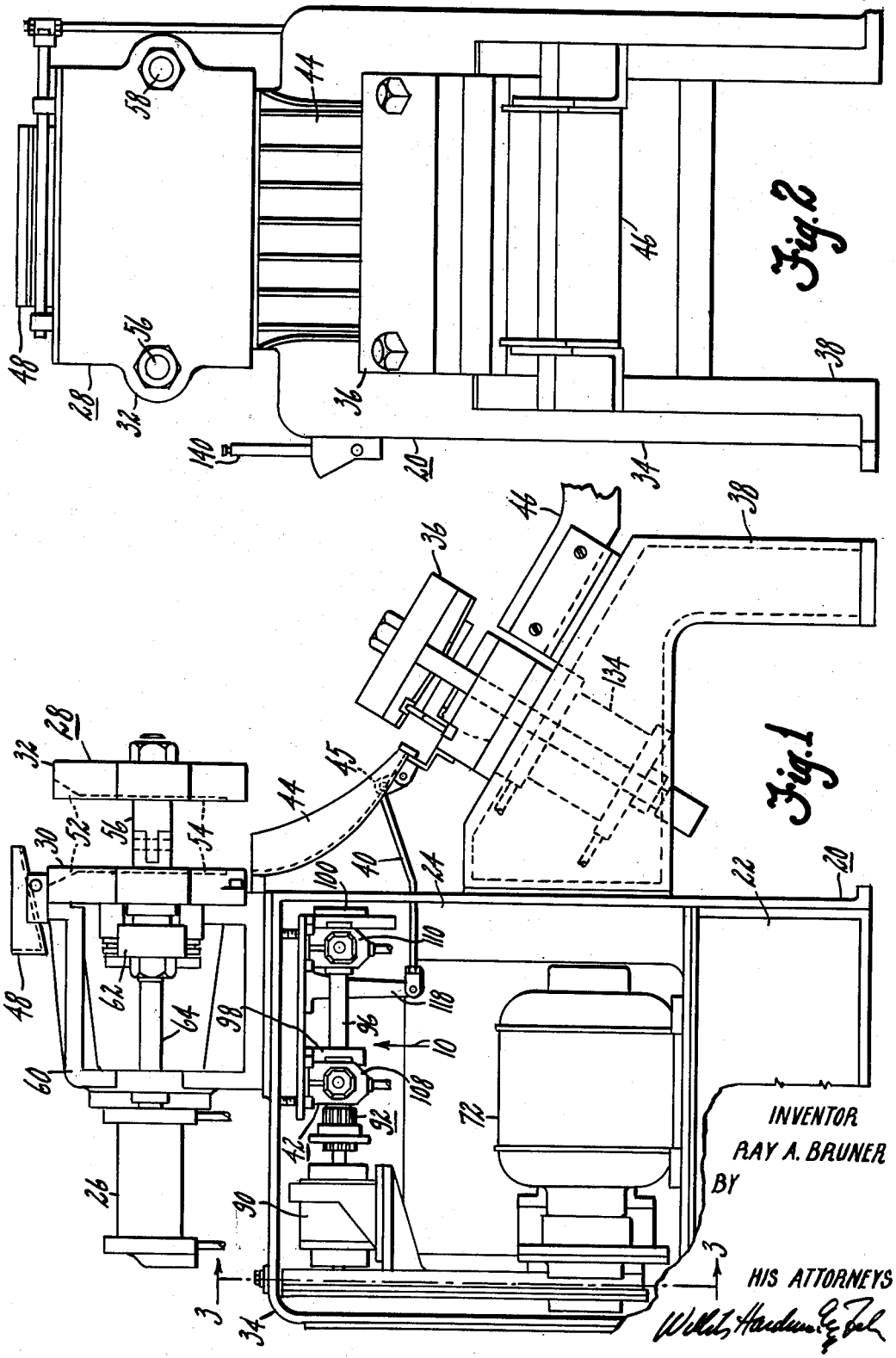
INVENTOR.
RAY A. BRUNER
BY
HIS ATTORNEYS

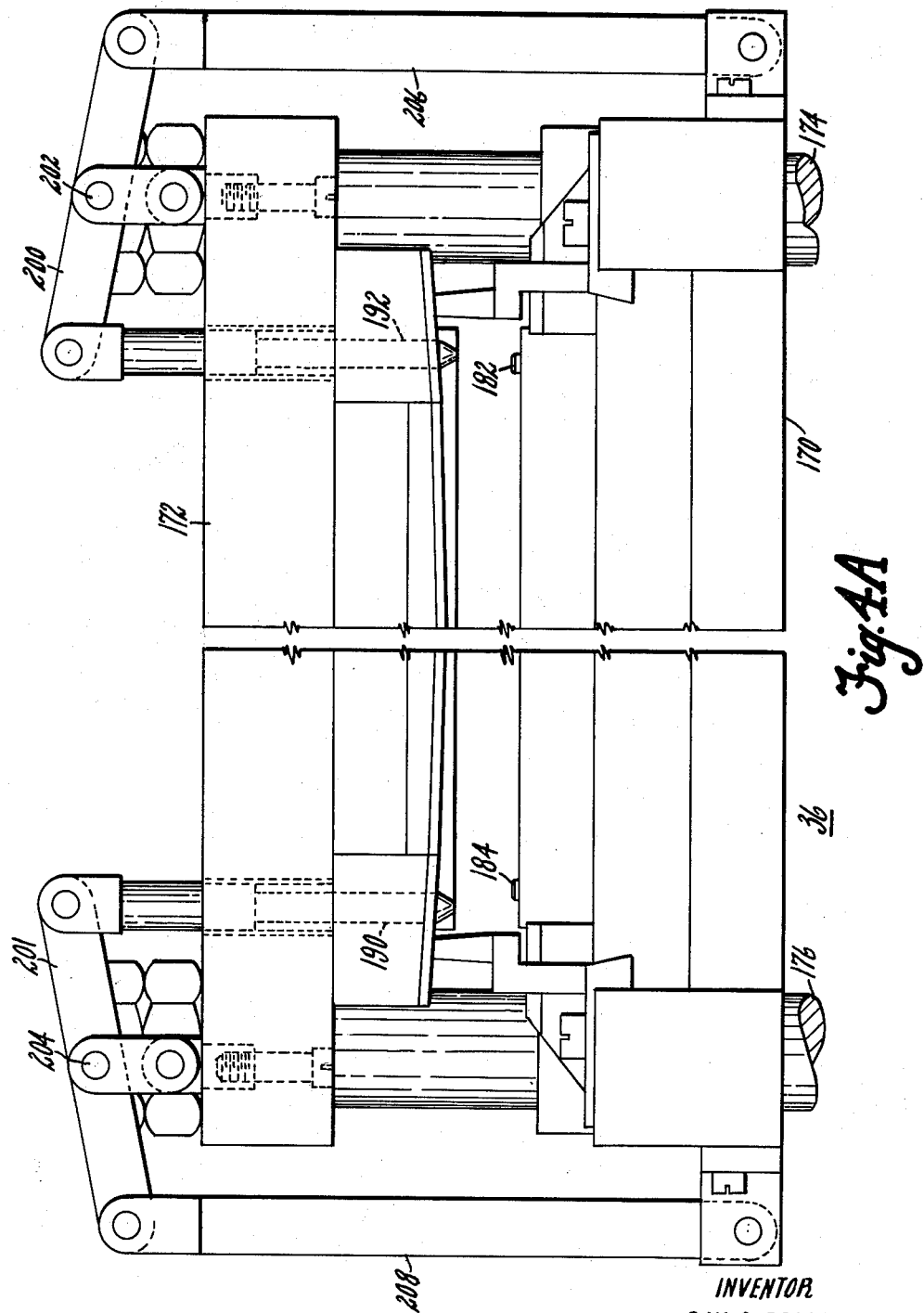

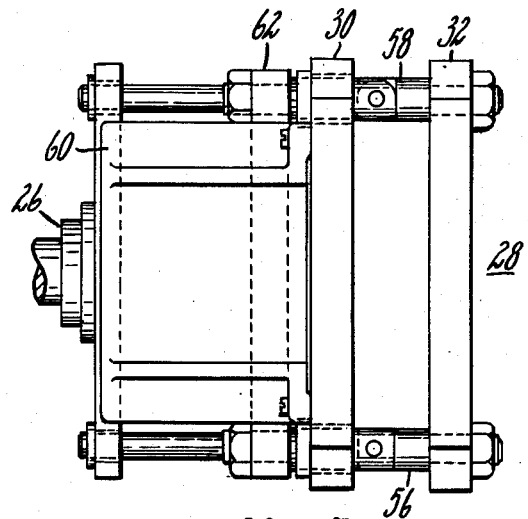
Fig. 5
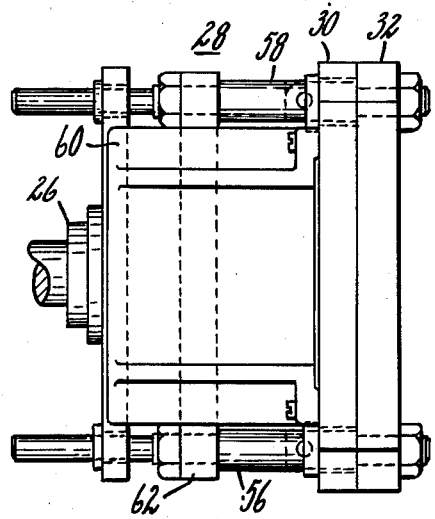
Fig. 6
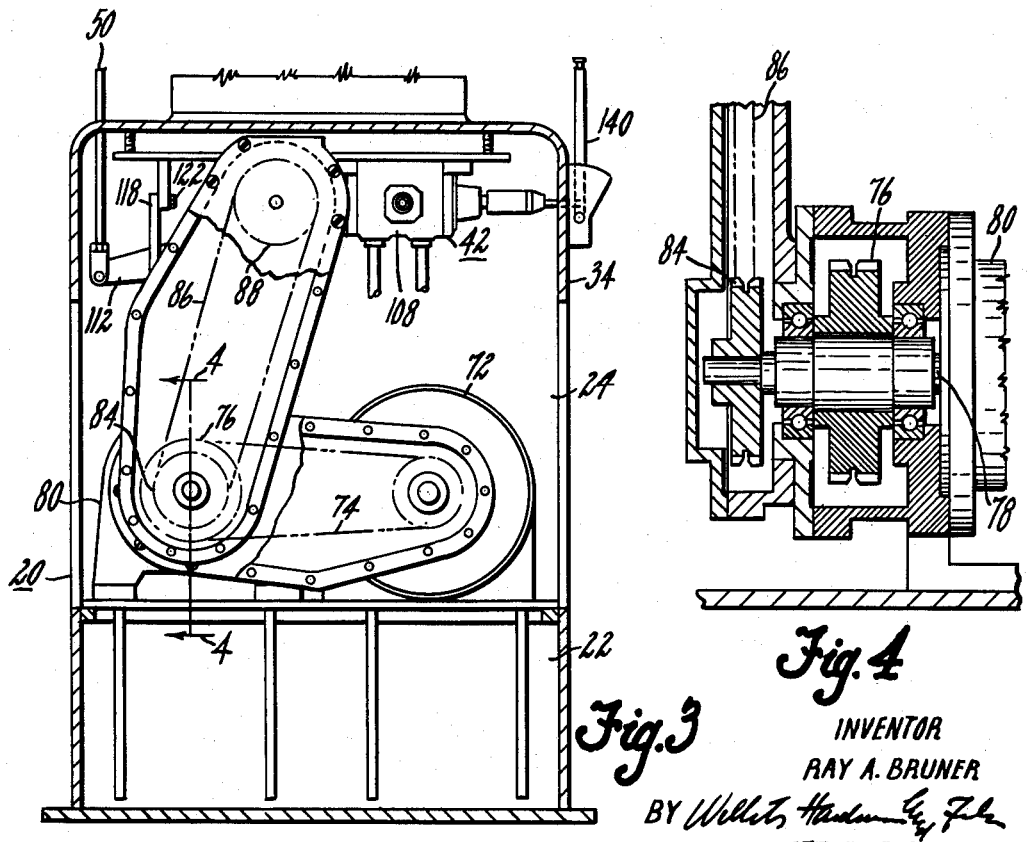
Fig. 3
Fig. 4
INVENTOR
RAY A. BRUNER
BY
HIS ATTORNEYS

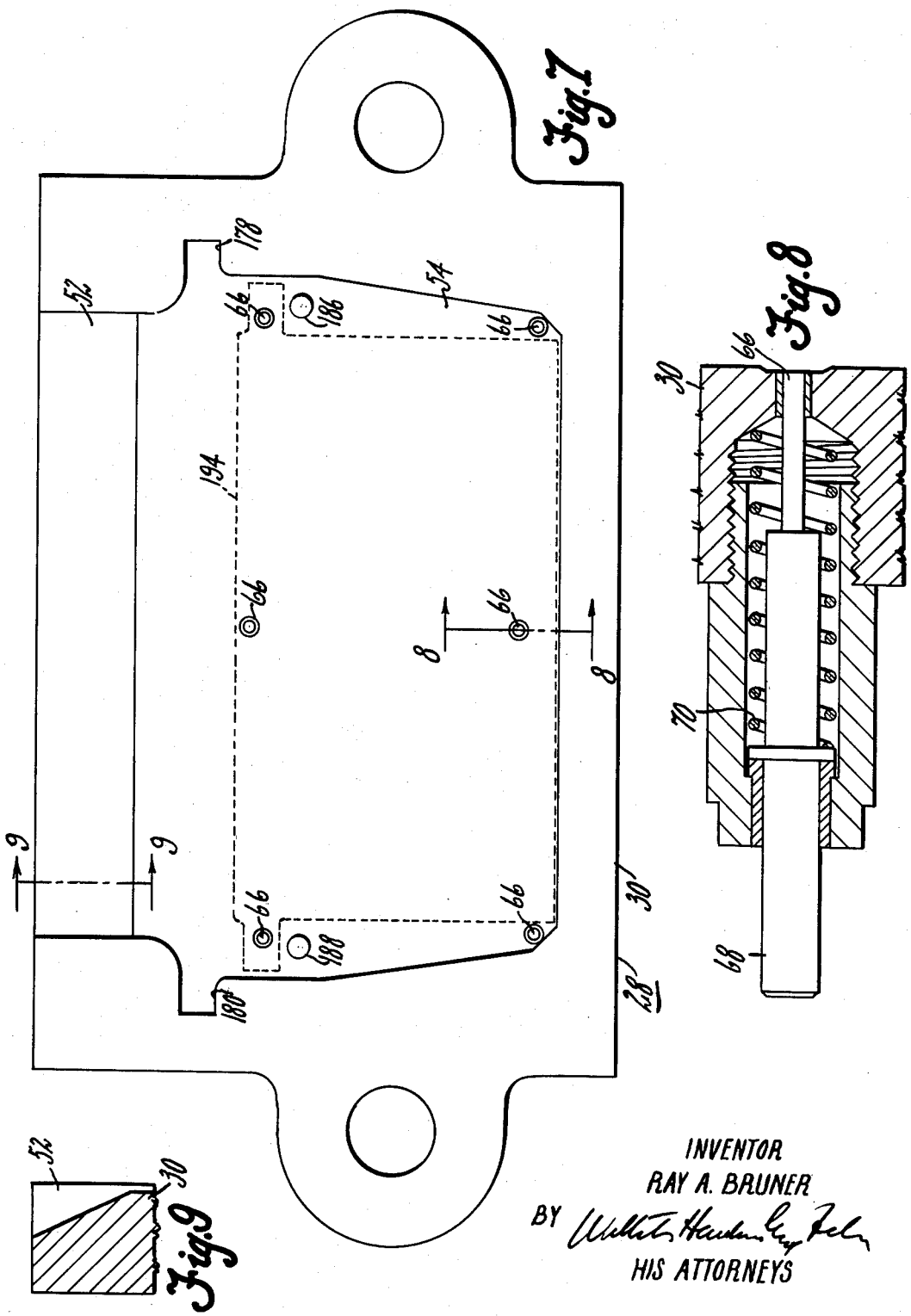

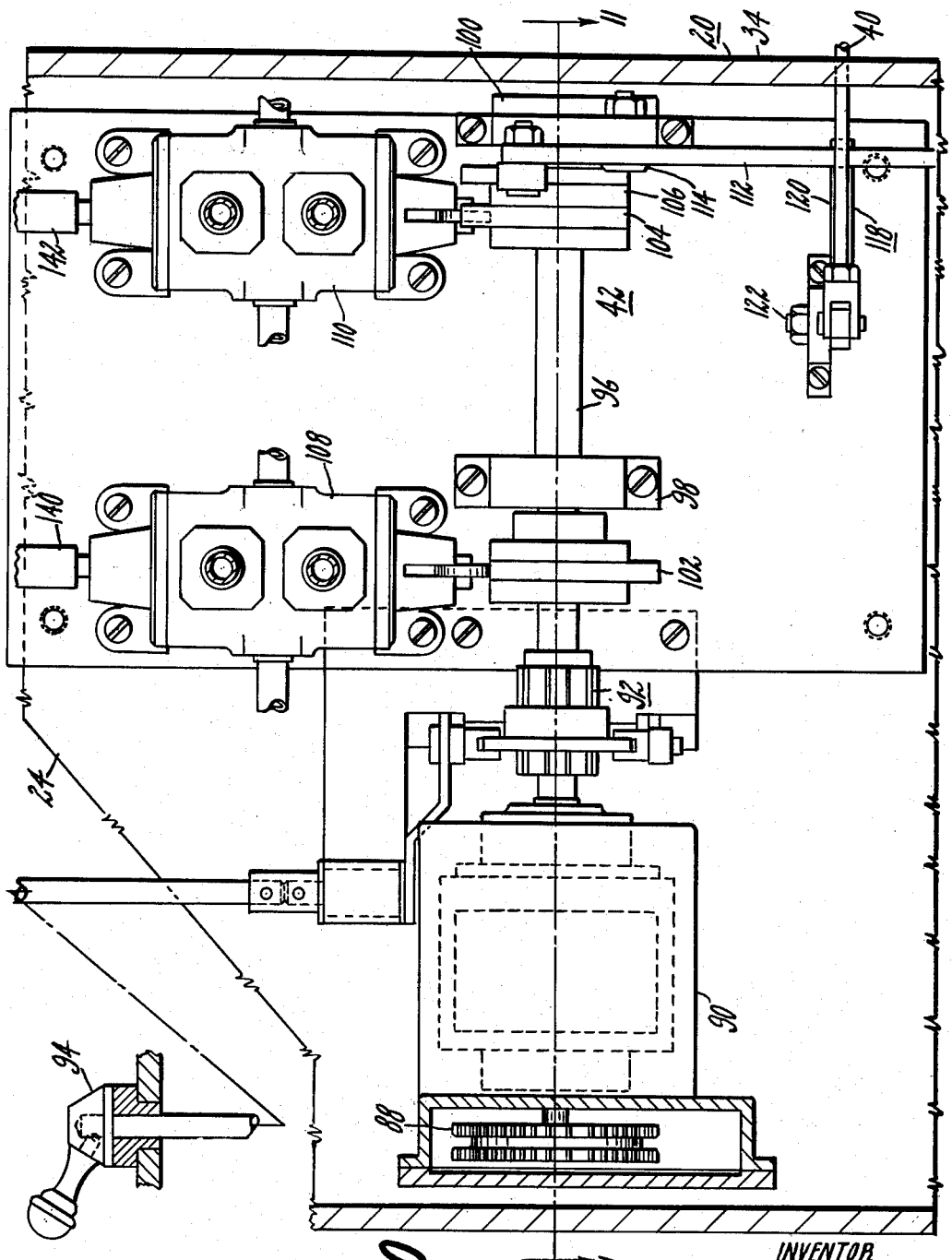

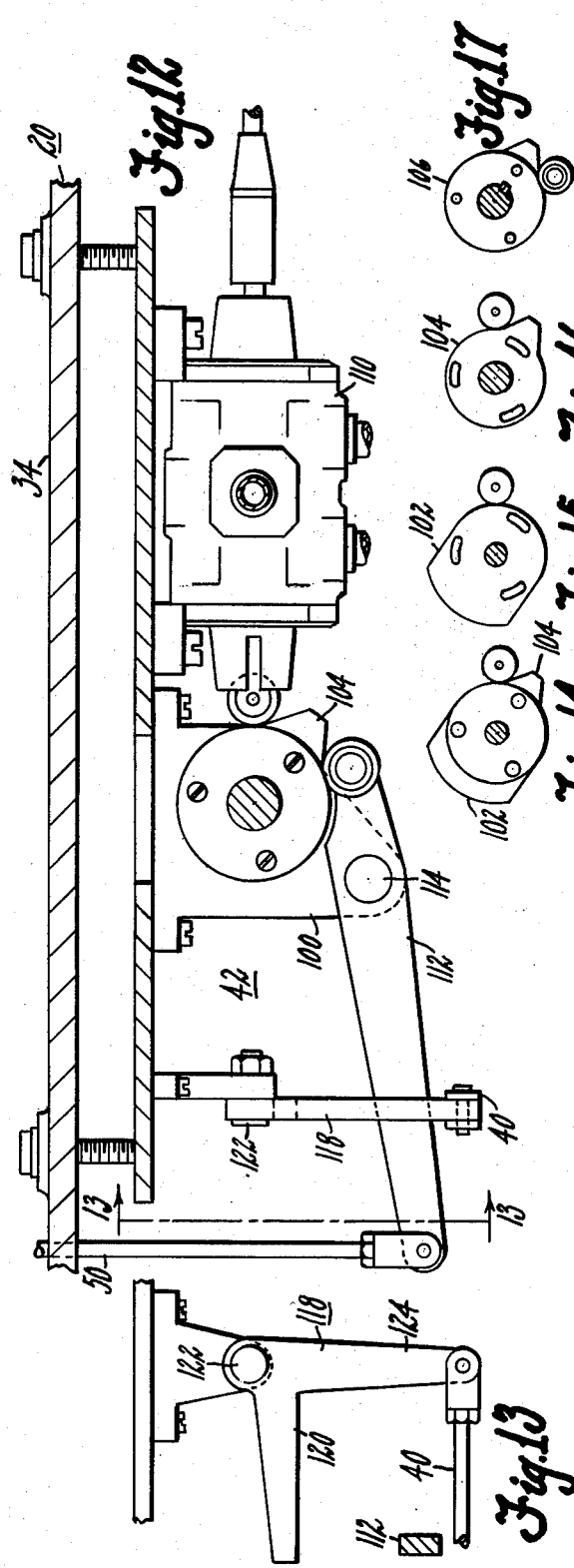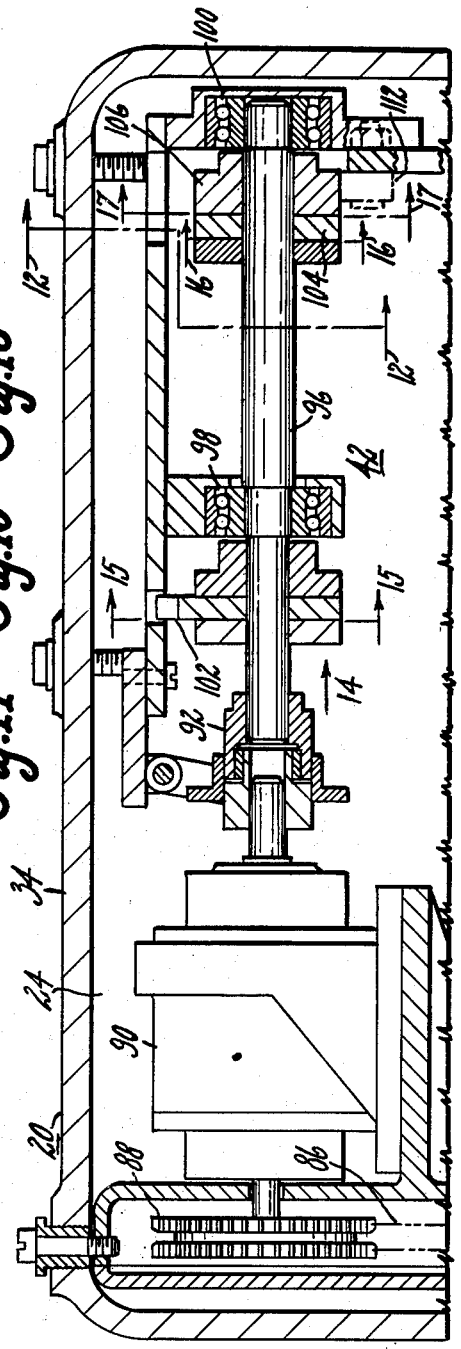

INVENTOR
RAY A. BRUNER
BY Willets Harding
HIS ATTORNEYS

April 10, 1956　　　R. A. BRUNER　　　2,741,012
MOLDING MACHINE

Filed June 8, 1950　　　　　　　　8 Sheets-Sheet 8

INVENTOR
RAY A. BRUNER
BY
HIS ATTORNEYS

United States Patent Office 2,741,012
Patented Apr. 10, 1956

2,741,012
MOLDING MACHINE

Ray A. Bruner, Muncie, Ind., assignor to General Motors Corporation, Detroit, Mich., a corporation of Delaware Application June 8, 1950, Serial No. 166,875

2 Claims. (Cl. 29—2)

This invention relates to casting machines and is particularly directed to automatically operated casting machines.

It is, therefore, one of the objects of the present invention to provide an automatically operated casting machine which proceeds through a complete cycle of operations to form castings from molten material.

Another object of the invention is to provide mechanism for controlling said machine whereby the automatic cycling operation thereof is predetermined and controlled.

A further object of the invention is to provide a machine including cam controlled mechanisms for automatically opening and closing the mold, filling the mold with molten material, ejecting the casting from said mold during each cycle of operation of the device.

Another object of the invention is to provide a machine for casting storage battery grids from lead alloy material wherein the machine passes through a predetermined cycle of operation for making the grid and wherein said cycle is periodically repeated through automatic controlled mechanism.

In carrying out the above object, it is a further object in some cases to provide a cutting die to be used in conjunction with the machine for cutting pairs of grids apart after they have been ejected from the mold and in some cases for trimming said parts, said die being automatically and cyclically operated in timed relation to the opening and ejection of the grids from the mold.

A still further object of the invention is to provide a cam controlled hydraulic system for operating the mold pouring ladle and, in some cases, the cutting die.

Another object of the invention is to provide a safety mechanism control for the molding die, which is controlled by a safety gate over the die. When said gate is in closed position, so that an operator cannot contact the die, the entire mechanism is in normal operating condition. However, if the safety gate is open, control circuits are energized which immediately lock the die hydraulically in its position whether open or closed or partially open whereby continued operation can not be resumed until the safety gate is again in closed position.

Another object of the invention is to provide a trimming and/or break apart die with automatic means for centering plate-like objects supplied thereto, which means upon the opening of the die also acts as a stripper to remove certain portions of the material operated upon from the die.

Further objects and advantages of the present invention will be apparent from the following description, reference being had to the accompanying drawings, wherein preferred embodiments of the present invention are clearly shown.

In the drawings:

Fig. 1 is a side view of the machine assembly with the cover plates removed so that some of the mechanism is visible.

Fig. 2 is an end view of the machine shown in Fig. 1.

Fig. 3 is a view taken on line 3—3 of Fig. 1, showing the chain drive for the cam and pump assembly.

Fig. 4 is a view taken in section on line 4—4 of Fig. 3, showing the chain connection between the pump, motor and cam operating control.

Fig. 4A is a side view of one type of trimming die, showing the automatic locating means which also act as strippers.

Fig. 5 is a top view of the mold shown in connection with the machine in Fig. 1, wherein the die is in open position.

Fig. 6 is a view of the mold in Fig. 5 with the mold in closed position.

Fig. 7 is a plan view of one-half of the mold.

Fig. 8 is a sectional view on the line 8—8 of Fig. 7, wherein the knock-out pins are shown on an enlarged scale.

Fig. 9 is a fragmentary view taken in section on the line 9—9 of Fig. 7, showing the gate portion of the mold.

Fig. 10 is a plan view of the main operated hydraulic control mechanism taken in the direction of arrow marked 10 in Fig. 1.

Fig. 11 is a sectional view taken on the line 11—11 of Fig. 10.

Fig. 12 is a sectional view taken on the line 12—12 of Fig. 11.

Fig. 13 is a fragmentary view taken on the line 13—13 of Fig. 12.

Fig. 14 is a view taken in the direction of arrow marked 14 in Fig. 11 showing the composite end view of the cams.

Fig. 15 is a view, partly in section, taken on line 15—15 of Fig. 11, showing the detailed construction of one cam with its cam follower.

Fig. 16 is a view taken on the line 16—16 of Fig. 11, showing detailed construction of another cam and its cam follower.

Fig. 17 is a view taken on line 17—17 of Fig. 11, showing detailed construction of still another cam and its cam follower.

Figure 18:
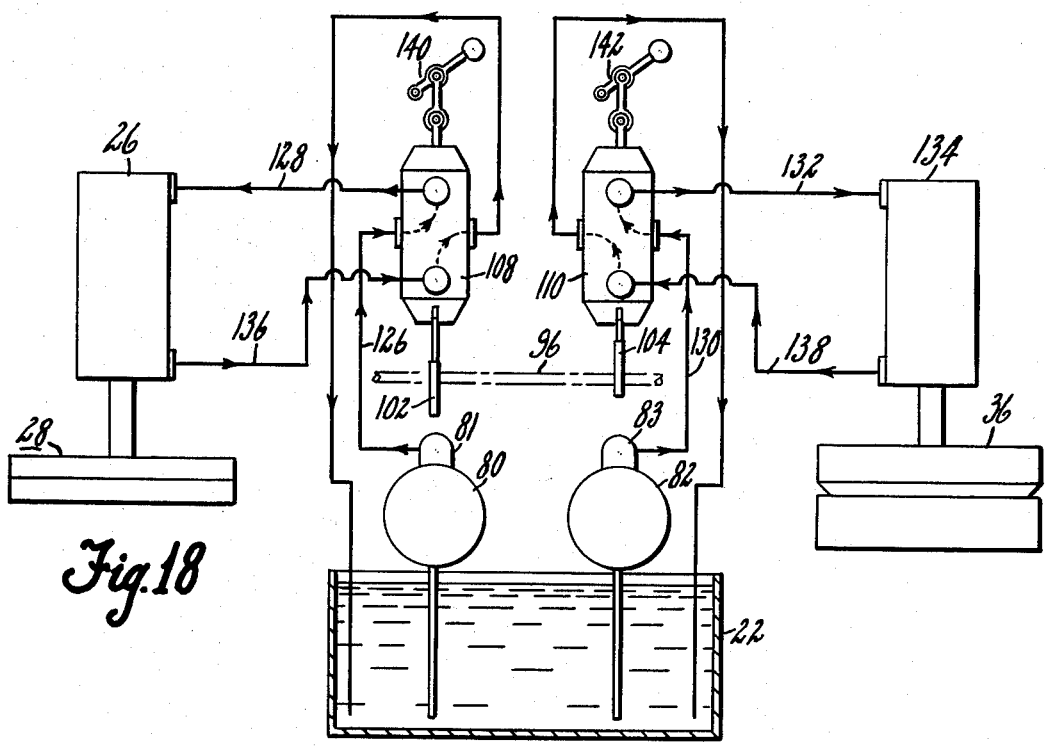
Fig. 18 is a schematic diagram showing the hydraulic operating system of the device with the mold and die in closed position.

An apparatus for casting battery grids and like articles is usually very bulky in character and requires considerable attention in order to perform satisfactory operations. The present invention is directed to a simplified machine for casting battery grids or similar plate-like articles wherein a relatively small size device is utilized which, due to the unique hydraulic controls, performs the casting functions automatically in timed cycles whereby grids are produced and ejected periodically throughout any extended period of operation of the machine.

Referring specifically to Fig. 1, the grid casting machine is shown at 20 and includes a fluid reservoir 22 in the base portion thereof, a mechanism containing chamber 24, an hydraulic operating cylinder 26 and a two-section mold 28 including sections 30 and 32. All of these parts are supported by a steel framework 34 which is box-like in character with removable panels to provide easy access to the machinery therein. In some cases where a cut-apart and/or trimming operation is desired, a die 36 is attached to the machine 20 which is supported upon a steel support 38 attached to the main frame 34 of the machine. The die 36 is operated through lever 40 from the cam controlled mechanism 42 to be described hereinafter in more detail.

Grids ejected from the die 28 drop directly onto a chute 44 whence they are delivered by gravity to the die 36 through the action of lever 40. The die 36 cuts apart the grids which are generally cast in pairs whence the grids pass through a chute 46 into a supply bin not shown. On top of the mold 28 there is carried a ladle 48 which is tiltable through the action of a rod 50 shown in Fig. 3, which rod is actuated by the cam controlled mechanism 42. The ladle is periodically tilted to supply molten metal to the mold 28. The tilting of the ladle 48 is timed so as to occur only when the die sections 30 and 32 are in closed position whereupon the molten metal is poured into the gate 52 thereof as shown in more detail in Fig. 9, whence it flows into the main cavity 54, a portion of which is carried by each die section 30 and 32. The ladle is periodically supplied from a melting pot or furnace, not shown, and this supply may be accomplished manually or by a valve controlled by the position of the ladle, such expedient being well known in the art.

Referring specifically to the mold assembly shown in Figs. 5 and 6, the mold 28 includes the two sections thereof 30 and 32, the section 30 being of a permanent fixed nature while the section 32 is slidable with respect thereto being supported and carried by bars 56 and 58 which pass through apertures in the fixed section 30. The fixed section 30 in turn is supported by a yoke 60 which likewise carries the hydraulic cylinder 26 (shown in Fig. 1). Cylinder 26 is connected to a yoke 62 through a piston rod 64 and when the cylinder is energized by hydraulic fluid passing in one end thereof, the section 32 of the die is moved outwardly as shown in Fig. 5, whereas when the cylinder is energized by fluid passing in the other direction therethrough, the section 32 is pulled backwardly into mating position as shown in Fig. 6.

In order to eject molded grids from the die a plurality of knock-out pins 66 are provided in section 30 of the mold. These pins are shown in detail in Fig. 8, wherein they are spring pressed into retracted position normally so that the face of the pin is flush with the face of the mold. However, when the mold is open, the yoke 62 comes into contact with the outer ends 68 of the pins, compresses the springs 70 which hold the pins in retracted position and thereby operates the ejection pins 66 to force the grid out of the mold section 30 whereupon it drops into chute 44. Obviously, as the mold 28 again closes the yoke 62 is removed from contact with the pins 66 and the pins again retract so as to be flush with the surface of the mold as shown in Fig. 8.

The shape of the cavity 54, shown in Fig. 7, is that of two joined grids. A casting from this cavity may be broken apart by the die 36 or by any other suitable means. It is apparent in this connection that single grids may be made but the patricular shape of the grids makes the operation more simple to perform in pairs since the mold cavity is then of symmetrical character.

The entire machine 20 is driven by a motor 72 shown in Fig. 3. The motor is connected by a chain 74 to a sprocket 76 shown in Fig. 4, which is connected through shaft 78 to either one of two pumps, a portion of one being shown at 80. When one pump 80 is used, no die is utilized in connection with the machine, such as die 36. On the other hand, if die 36 is used, two pumps 80 and 82 are used which are placed in line and driven off the same shaft. The chain connection 74 of motor 72 to sprocket 76 is further carried by sprocket 84 through chain 86 to sprocket 88 shown in Fig. 10, which is connected to gear reducer 90 that, in turn, operates the cam controlled mechanism. Normally, the sprocket 88 is driven at a speed of about 1200 R. P. M. if a conventional motor is utilized at 72, whereas the speed reducer 90 is designed for 100 to 1 reduction so that the output thereof is approximately 12 R. P. M. which output, when stated in terms of cycles of the machine, operation permits a five second cycle since there are twelve revolutions of the cam shaft per minute.

The output of the speed reducer 90 is connected directly into a splined type clutch 92 shown in section in Fig. 11, which clutch is operated manually through lever 94. Thus when it is desired to start the machine, lever 94 is operated to engage the clutch 92 which automatically engages cam shaft 96 with the speed reducer 90.

The cam shaft 96 is journaled in bearings 98 and 100 and carries three cams 102, 104 and 106 therein. Cam 102 operates a hydraulic control cylinder 108 shown in Fig. 10. Cam 104 operates a second hydraulic control cylinder 110 while cam 106 operates a pivoted lever 112. Each of the hydraulic cylinders 108 and 110 and the lever 112 preferably include rotatable cam followers to reduce friction. When cam 106, which is axially aligned with cam 104, operates against the lever 112, it causes the lever 112 to move downwardly around pivot 114 to elevate rod 50 which is attached to the ladle 48 shown in Fig. 1. This action tips the ladle at a time when the mold 28 is in closed position so that molten metal in the ladle is poured into the mold. Movement of lever 112 has a second function when it is moved upwardly a predetermined distance, namely, it engages an L-shaped lever 118 having an arm 120 which is engaged by the lever 112 whereby the lever 118 is pivoted around point 122 to move arm 124 clockwise, thereby forcing associated rod 40 to move inwardly which releases the mechanical stop 45 in chute 44. Obviously, when the lever 112 passes over the cam surface 106, the rod 50 is retracted to move the ladle to a non-pouring position and similarly, the lever 118 is rotated counterclockwise to close the mechanical stop in chute 44. Thus, both of these functions, actuated by the lever 112, occur once on each rotation of the cam 106.

Cams 102 and 104 actuate the hydraulic control cylinders 108 and 110. These cylinders are double-acting cylinders and are supplied fluid under pressure by pumps 80 and 82 respectively. It will be noted that the cam 102 is displaced 180° from the cam 104 so that the cylinders operate in reverse cycle from one another.

Figure 19:
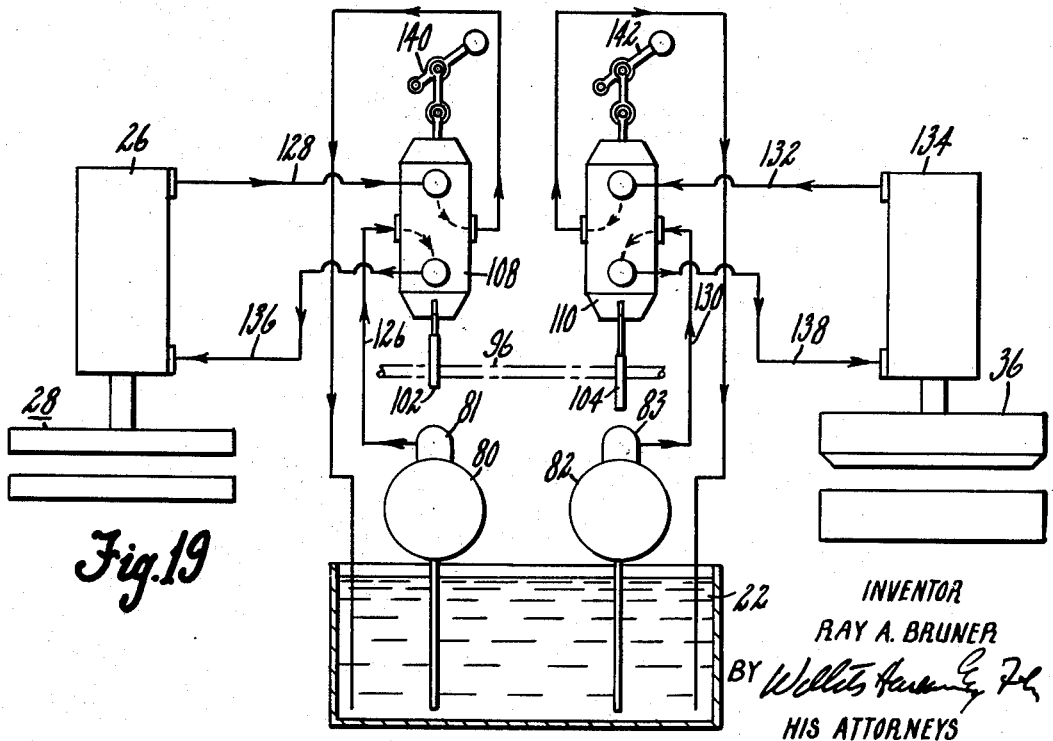
Fig. 19 is a schematic operated diagram of the mold and die in open position.

Referring specifically to Fig. 18, a diagrammatic view of the setup is shown with the mold 28 and the cut-apart die 36 both in closed position. In the operation of the device, an open oil sump 22 is provided from which fluid is supplied by pumps 80 and 82. Pump 80 supplies the hydraulic power for cylinder 108 and pump 82 supplies fluid power for cylinder 110. The pumps 80 and 82 include pressure regulators 81 and 83 at the outlets thereof. Referring specifically to Fig. 18, the hookup of cylinder 108 is such that when the cam 102 is in the non-engaging position, the control cylinder 108 permits pressurized fluid to pass from pump 80 through pipe 126 through cylinder 108 and through pipe 128 to close the mold 28 through the action of operating cylinder 26. At the same time cam 104 has engaged the actuating mechanism of control cylinder 110 so that fluid from pump 82 passes through pipe 130 through the cylinder 110 through pipe 132 to cause a second operating cylinder 134 to actuate die 36 to closed position. Cylinder 134 is similar in function to the cylinder 26 and periodically actuates the die 36 into open and closed position as controlled by cam 104 and control cylinder 110. Further rotation of the cam shaft 96 causes the cams 102 and 104 to change position as shown in Fig. 19, wherein cylinder 108 is reversed so that fluid from pump 80 now passes through pipe 126 through the cylinder 108 and upwardly through the pipe 136 into the cylinder 26 to cause the cylinder to open the mold 28. At the same time, the other pump 82 is passing fluid through pipe 130 through cylinder 110, through pipe 138 to cylinder 134 to open the die 36. Thus the control cylinders 108 and 110 act in reverse directions from one another to periodically operate the mold 28 and the die 36. It should be noted that the timed relation of the cams is such that when the mold 28 is first closed, then the ladle rod 50 is pushed upwardly to tip the ladle 48 and supply molten metal to the mold 28. This action is momentary, however, and is timed so that during the last portion of the pour, the mechanical stop 45 is operated through the action of rod 40 to permit retained castings in chute 44 to slide into the die 36 which is open whereupon the mechanical stop 45 is again closed, the pour is stopped and finally the mold 28 opens and ejects the next casting into the chute 44. Simultaneously, with this action, however, the trim die 36 closes to trim the plates or castings and the process is repeated with each closing of mold 28. In view of the timing of the device under the present setup using a twelve to one speed reducer 90, twelve cycles occur per minute.

Cylinders 108 and 110 each include manually operating means operated by handles 140 and 142 respectively. These manual means are used only in case of emergency or for checking the operation of the device when the cam shaft is not engaged.

It is apparent that castings other than grids can be made in this machine with equal success and that instead of a trim die 36, the die 36 may be a cut-apart die, a straightening die, or, for that matter, any other operating die desired. In all cases, the function of the machine remains the same.

Figure 20:
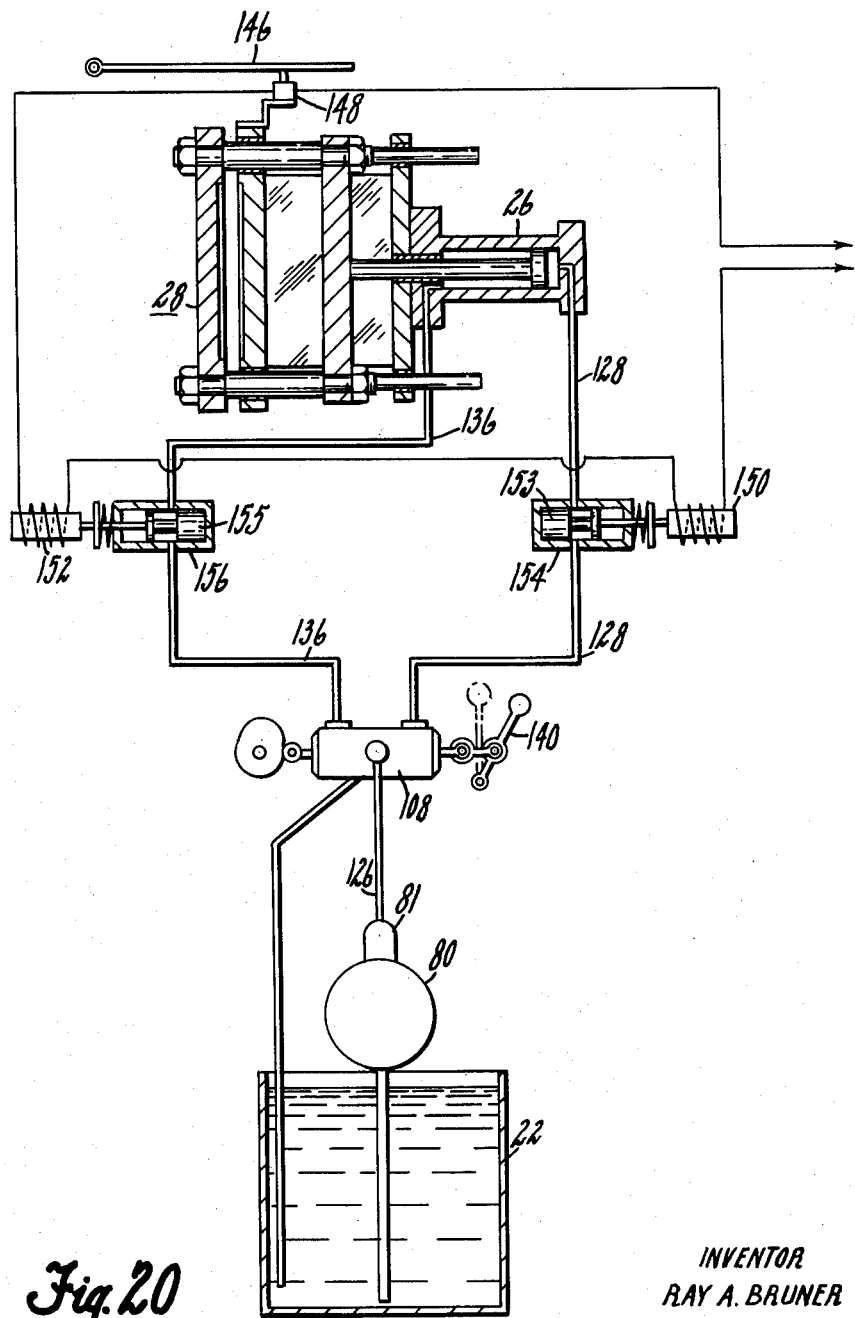
Fig. 20 is a diagrammatic view showing a safety mechanism hookup which is used in connection with the present machine.

A safety setup is also provided for use in connection with this machine. This is shown diagrammatically in Fig. 20, wherein the mold 28 and operating cylinder 26 therefor, are shown together with the pressure cylinder 108, pump 80 and sump 22. In this connection, a safety gate 146 is provided with covers for the open end of the mold 28 so that an operator cannot place his hands within the mold without raising the gate. The gate, when closed, closes a micro switch 148 which is connected in series with a pair of solenoid coils 150 and 152. Coils 150 and 152 are connected with small control cylinders 154 and 156 respectively which are placed in pipe lines 128 and 136 respectively. So long as switch 148 is in closed position, the coils 150 and 152 are energized which holds the pistons within cylinders 154 and 156 in position to permit free flow therethrough so that fluid in pipes 128 and 136 may pass without restriction through the control cylinders. However, at any time when the safety gate 146 is raised, the switch 148 opens to break the circuit through the solenoids whereupon the pistons 153 and 155 in cylinders 154 and 156 are spring-actuated to close off pipes 128 and 136 completely. This locks cylinder 26 in whatever position it may be in instantly whereby the mold 28, if open, remains open, if closed, remains closed. In this manner, it is impossible for an operator to become injured since there is no drift or lag between the safety gate 146 if open and the time that the cylinder 26 is made inoperative through the complete closure of all pipe lines leading to and from the cylinder. When using the safety device and for that matter, at other times, it is desirable to have pressure relief valves in the pressure regulators 81 and 83 respectively so that if and when flow through the pipes is stopped, there will be no injury to the operating parts of the system, this modification being standard procedure in hydraulic pistons.

It will be noted that the control cylinders 154 and 156 or, as they are sometimes called, control valves operate whenever the current is off. In this manner, if a momentary current failure occurs, it is impossible to operate the mold upon reestablishment of the current until the safety gate is closed. This prevents the possibility of an operator cleaning the mold during the current failure and having said mold close upon his hands. The safety feature of the control valves 154 and 156 is not dependent on current to operate the valves and to provide the safety feature, it being necessary that current is provided to permit normal operation of the device.

It is understood that this safety feature may be incorporated in any type of hydraulically operated machine. Furthermore, it is apparent that in place of the micro switch 148 a hydraulic control circuit may operate valves 154 and 156 or a mechanical linkage may be provided for effecting the same operation, all being within the scope of the present invention, electrical hook-up being by far the least expensive and more facile to install.

Fig. 4A shows a unique style of trimming die which may be used with the present setup, it being understood that dies without the features to be explained hereinafter may also be used if desired. The die shown in Fig. 4A has a base section 170 and a movable upper section 172 carried by rods 174 and 176, respectively, which are actuated by means of hydraulic cylinder 134. The grid or other plate-like material to be trimmed preferably includes ears as formed by the portions 178 and 180 shown in the mold in Fig. 7. These ears catch against a pair of pins 182 and 184 on the portion 170 of die 36 and partially position the grid. Molded into the grid are two holes which are formed by pins 186 and 188 in the mold cavity as shown in Fig. 7. These pins form two holes in the grid. After the grid is positioned by the ears 178 and 180 bearing against pins 182 and 184, the upper section 172 of the die commences to close and centering pins 190 and 192, having tapered ends thereon as shown in Fig. 4A, descend at a rate greater than the rate of descent of the upper die section 172. Thus the pins 190 and 192 pass through the holes in the grid as formed by pins 186 and 188 in the mold and in this manner positively center the grid in the trimming die 36. Upon the opening of the die 36, the pins 190 and 192 move upwardly at a rate greater than does the upper die section 172 and thus stripping that portion of the grid which is superficially adhered thereto from the pins. The centering holes are preferably in a portion of the grid which is trimmed away and in Fig. 7, the dotted line configuration 194 indicates the approximate trimmed shape of the part or grid. It will thus be seen that the holes as formed by the pins 186 and 188 in the mold are trimmed off and discarded and are merely used as a positive positioning means.

The differential speed of movement between the centering pins 190 and 192 and the die section 172 is best accomplished through the use of a mechanical movement as provided by the levers 200 and 201 which are pivoted at 202 and 204, respectively, and which are held at their opposite ends by immovable rods 206 and 208, respectively, attached to the base section 170 of the die. Thus as the upper section 172 of the die moves downwardly, the levers 200 and 201 act as walking beams to press the centering pins 192 and 190 downwardly at a speed determined by the fulcrum pont of the levers and in this case at a speed greater than the speed of descent of the portion 172 of the die.

This specific centering expedient not only acts as a centering device as explained heretofore, but also provides a stripping action for this scrap material trimmed off the grid whereby the scrap material is pulled free from the centering pins upon their ascent and falls upon a scrap belt, not shown.

It is apparent that various modifications may be made in the specific construction details of the grid molding machine as explained herein, for example, in place of dual pumps, 80 and 82, the device may be made less expensively by using a single pump with suitable check valves to maintain pressure in the various portions of the die. Similarly, in place of the chain and sprocket drive and the necessary clutch mechanism 92 to connect the cam shaft 96 to the driving mechanism through the speed reducer 90, it is apparent that the cam shaft 96 may be directly connected to a second motor through a speed reducer whereby the action of the cam shaft is independent of the operation of the pump or pumps. In this manner, the clutch may be eliminated if desired, and the cam shaft mechanism may be started by merely pressing a start button for a motor. All of these modifications come within the scope of my invention which basically is directed to a grid casting machine having unique control features together with a novel safety mechanism and trimming die to be used in the combination.

While the embodiments of the present invention as herein disclosed, constitute preferred forms, it is to be understood that other forms might be adopted.

What is claimed is as follows:

1. An automatic molding machine for sheet-like material comprising in combination, a vertically set, two-part, separable mold movable to open and closed positions, and including a die cavity formed between said parts when the mold is in closed position, said cavity having a configuration similar to the sheet-like material desired, hydraulic means for opening and closing said mold, a trimmer die spaced from said mold, a stationary chute connecting the mold and the die, stop means adjacent the lower end of said chute for preventing sheet-like material on the chute from entering the die, ejecting means associated with said separable mold for ejecting sheet-like material cast therein into said chute upon each opening of the mold, hydraulic means for operating the trimmer die, separate control means for operating the first and second hydraulic means, a timing mechanism for operating said two control means in a predetermined sequence whereby said first and second hydraulic means are caused to operate in sequential timed relation to one another, the mold is opened and closed and permitted to dwell and is then opened and wherein the trimmer die is actuated to closed position once upon each opening operation of the mold, mechanical means interconnected with said timing mechanism for releasing said stop means upon each opening movement of said die to permit a piece of sheet-like material to fall into said die from the chute, said stop means being timed to be actuated during the period that the mold is in closed position, and a ladle for containing molten material to be poured into said mold said ladle being mechanically tipped immediately after closing of said mold, each of said mechanical movements being initiated by the same timing mechanism which operates the control means.

2. An automatic grid molding machine for sheet-like material, such as grid castings for storage batteries and the like, comprising in combination, a vertical two-part separable mold defining a cavity therebetween, hydraulic means adapted to open and close said mold, valve means operated in a predetermined timed sequence for reversing the flow of pressurized fluid to said hydraulic means for operating the same, a pouring ladle adapted to pour molten material in predetermined quantities into said mold, mechanical means timed in relation to said hydraulic means for causing said ladle to pour each time the mold first closes, ejecting means mechanically operable each time the mold opens for ejecting a grid casting therefrom, a chute having one end positioned below said mold for catching the ejected grid casting and for conveying it by gravity to a point remote from the mold, stop means associated with said chute for stopping movement of said casting therein, mechanical means operable in timed relation with the opening of said mold for nullifying the effectiveness of said stop means, a trimming die located at the other end of said chute, hydraulic means adapted to cause said die to open and close, valve means for controlling said hydraulic means, said valve means reversing the flow of pressurized fluid to said hydraulic means for operating the same in timed relation to the operation of said ladle, mold and stop means, and a timing device for initiating the action of said hydraulic and mechanical control means.

References Cited in the file of this patent

UNITED STATES PATENTS

| 1,951,932 | Henry et al. | Mar. 20, 1934 |
| 2,107,041 | Luhrman | Feb. 1, 1938 |
| 2,113,033 | Poole et al. | Apr. 5, 1938 |
| 2,156,379 | Donath | May 2, 1939 |
| 2,227,872 | Willard | Jan. 7, 1941 |
| 2,277,234 | Kerns | Mar. 24, 1942 |
| 2,451,010 | Yanchenko | Oct. 12, 1948 |
| 2,570,383 | Russell | Oct. 9, 1951 |
| 2,638,982 | Winkel | May 19, 1953 |